US011766965B2

United States Patent
Meijers et al.

(10) Patent No.: US 11,766,965 B2
(45) Date of Patent: Sep. 26, 2023

(54) ILLUMINATED GRAPHIC IN AN AUTOMOTIVE PLASTIC GLAZING

(71) Applicant: SABIC Global Technologies B.V., Bergen op Zoom (NL)

(72) Inventors: Augustinus Gregorius Henricus Meijers, Breda (NL); Matteo Terragni, Misinto (IT); Geert Jan Schellekens, Glize (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/962,838

(22) Filed: Oct. 10, 2022

(65) Prior Publication Data

US 2023/0032224 A1 Feb. 2, 2023

Related U.S. Application Data

(63) Continuation of application No. 16/822,187, filed on Mar. 18, 2020, now Pat. No. 11,466,834, which is a (Continued)

(51) Int. Cl.
*B60Q 1/26* (2006.01)
*F21S 43/245* (2018.01)
(Continued)

(52) U.S. Cl.
CPC ............ *F21S 43/245* (2018.01); *B29C 45/16* (2013.01); *B60J 1/20* (2013.01); *B60Q 1/26* (2013.01);
(Continued)

(58) Field of Classification Search
CPC .......... B02B 6/001; B60Q 1/268; B60Q 1/26; B60Q 3/02; B60Q 3/208; B29C 45/16; F21S 43/237; F21S 43/245
See application file for complete search history.

(56) References Cited

U.S. PATENT DOCUMENTS

| 4,551,484 A | 11/1985 | Radisch et al. |
| 4,558,634 A | 12/1985 | Oshiro et al. |
(Continued)

FOREIGN PATENT DOCUMENTS

| CA | 2762401 A | 6/2012 |
| CN | 1668461 A | 9/2005 |
(Continued)

OTHER PUBLICATIONS

U.S. Appl. No. 61/935,718, filed Feb. 4, 2014.
(Continued)

*Primary Examiner* — Julie A Bannan
(74) *Attorney, Agent, or Firm* — CANTOR COLBURN LLP

(57) ABSTRACT

A plastic glazing of a window of a vehicle having a light feature includes a first vehicle window glazing component, a second vehicle window glazing component molded onto the first vehicle window glazing component, and a light unit configured to produce light for the light feature. The light unit being integrated with at least one of the following: the first vehicle window glazing component and the second vehicle window glazing component. The light unit further configured to direct the light for the light feature through or from at least one of the following: the first vehicle window glazing component and the second vehicle window glazing component. The plastic glazing is a one-piece molded plastic construction. At least one of the first vehicle window glazing component and the second vehicle window glazing component is translucent or transparent.

20 Claims, 9 Drawing Sheets

Related U.S. Application Data continuation of application No. 15/776,200, filed as application No. PCT/IB2016/057013 on Nov. 21, 2016, now abandoned.

(60) Provisional application No. 62/258,648, filed on Nov. 23, 2015.

(51) Int. Cl.

| | |
|---|---|
| *B60Q 3/20* | (2017.01) |
| *F21S 43/237* | (2018.01) |
| *B29C 45/16* | (2006.01) |
| *B60J 1/20* | (2006.01) |
| *F21V 8/00* | (2006.01) |
| *B60Q 3/208* | (2017.01) |
| *B60Q 3/76* | (2017.01) |
| *B60Q 3/30* | (2017.01) |
| *B60Q 3/74* | (2017.01) |
| *B29L 31/30* | (2006.01) |
| *B60Q 1/32* | (2006.01) |
| *B60Q 1/34* | (2006.01) |
| *B60Q 1/44* | (2006.01) |
| *B29C 45/00* | (2006.01) |

(52) U.S. Cl.
CPC .............. *B60Q 1/268* (2013.01); *B60Q 3/20* (2017.02); *B60Q 3/208* (2017.02); *F21S 43/237* (2018.01); *G02B 6/001* (2013.01); *B29C 45/00* (2013.01); *B29K 2995/0026* (2013.01); *B29L 2031/30* (2013.01); *B60Q 1/323* (2013.01); *B60Q 1/34* (2013.01); *B60Q 1/44* (2013.01); *B60Q 3/30* (2017.02); *B60Q 3/74* (2017.02); *B60Q 3/76* (2017.02)

(56) References Cited

U.S. PATENT DOCUMENTS

| | | |
|---|---|---|
| 4,609,688 A | 9/1986 | Radisch et al. |
| 4,636,698 A | 1/1987 | Leclercq |
| 4,645,970 A | 2/1987 | Murphy |
| 4,712,287 A | 12/1987 | Johnston |
| 4,765,672 A | 8/1988 | Weaver |
| 4,775,402 A | 10/1988 | Letemps et al. |
| 4,778,366 A | 10/1988 | Weaver |
| 4,792,425 A | 12/1988 | Weaver |
| 4,871,385 A | 10/1989 | Lecourt et al. |
| 4,888,072 A | 12/1989 | Ohlenforst et al. |
| 5,060,440 A | 10/1991 | Weaver |
| 5,071,709 A | 12/1991 | Berquier et al. |
| 5,324,374 A | 6/1994 | Harmand et al. |
| 5,443,862 A | 8/1995 | Buffat et al. |
| 5,451,090 A | 9/1995 | Brodie et al. |
| 5,495,400 A | 2/1996 | Currie |
| 5,505,023 A | 4/1996 | Gillen et al. |
| 5,508,585 A | 4/1996 | Butt |
| 5,637,363 A | 6/1997 | Leray et al. |
| 5,669,693 A | 9/1997 | Smith |
| 5,726,953 A | 3/1998 | Lapointe et al. |
| 5,757,127 A | 5/1998 | Inoguchi et al. |
| 5,772,304 A | 6/1998 | Smith |
| 5,776,603 A | 7/1998 | Zagdoun et al. |
| 5,780,965 A | 7/1998 | Cass et al. |
| 5,807,515 A | 9/1998 | Fisher et al. |
| 5,857,770 A | 1/1999 | Fohl et al. |
| 5,887,393 A | 3/1999 | Vanark et al. |
| 5,890,796 A | 4/1999 | Marinelli et al. |
| 5,965,981 A | 10/1999 | Inoguchi et al. |
| 6,054,189 A | 4/2000 | Bravet et al. |
| 6,106,931 A | 8/2000 | Ito et al. |
| 6,224,135 B1 | 5/2001 | Rehkopf |
| 6,241,302 B1 | 6/2001 | Rehkopf |
| 6,432,332 B1 | 8/2002 | Matsco et al. |
| 6,461,028 B1 | 10/2002 | Huang |
| 6,468,677 B1 | 10/2002 | Benton et al. |
| 6,536,930 B1 | 3/2003 | Hirmer |
| 6,585,402 B2 | 7/2003 | Ohkodo et al. |
| 6,627,319 B2 | 9/2003 | Jacquiod et al. |
| 6,660,968 B1 | 12/2003 | Mottelet et al. |
| 6,747,779 B1 | 6/2004 | Morin et al. |
| 6,811,857 B1 | 11/2004 | Bravet et al. |
| 6,811,895 B2 | 11/2004 | Murasko et al. |
| 6,852,393 B2 | 2/2005 | Gandon |
| 6,872,453 B2 | 3/2005 | Arnaud et al. |
| 6,908,204 B2 | 6/2005 | Kraft |
| 6,965,196 B2 | 11/2005 | Murasko et al. |
| 7,012,728 B2 | 3/2006 | Morin et al. |
| 7,018,057 B2 | 3/2006 | Richard |
| 7,024,822 B2 | 4/2006 | Scheer et al. |
| 7,025,482 B2 | 4/2006 | Yamashita et al. |
| 7,026,577 B2 | 4/2006 | Maeuser et al. |
| 7,048,400 B2 | 5/2006 | Murasko et al. |
| 7,048,422 B1 | 5/2006 | Solomon |
| 7,100,328 B2 | 9/2006 | Scheer et al. |
| 7,144,289 B2 | 12/2006 | Murasko et al. |
| 7,172,322 B2 | 2/2007 | Pommeret et al. |
| 7,265,889 B2 | 9/2007 | Morin et al. |
| 7,270,863 B2 | 9/2007 | Harima et al. |
| 7,290,906 B2 | 11/2007 | Suzuki et al. |
| 7,311,976 B2 | 12/2007 | Arnaud et al. |
| 7,318,663 B2 | 1/2008 | Verbrugh et al. |
| 7,469,450 B2 | 12/2008 | Gipson |
| 7,500,774 B2 | 3/2009 | Nishiyama et al. |
| 7,553,536 B1 | 6/2009 | Naoumenko et al. |
| 7,584,689 B2 | 9/2009 | Jones et al. |
| 7,654,721 B2 | 2/2010 | Okada |
| 7,686,489 B2 | 3/2010 | Ajiki et al. |
| 7,712,933 B2 | 5/2010 | Fleischmann et al. |
| 7,745,018 B2 | 6/2010 | Murasko et al. |
| 7,793,580 B2 | 9/2010 | Jones et al. |
| 7,806,538 B2 | 10/2010 | Ajiki et al. |
| 7,815,345 B2 | 10/2010 | Misawa et al. |
| 7,857,495 B2 | 12/2010 | Misawa et al. |
| 7,883,249 B2 | 2/2011 | Totani et al. |
| 7,892,661 B2 | 2/2011 | Boire et al. |
| 7,922,374 B2 | 4/2011 | Schwab et al. |
| 7,929,194 B2 | 4/2011 | Legois et al. |
| 7,985,011 B2 | 7/2011 | Ajiki et al. |
| 8,007,152 B2 | 8/2011 | Nakabayashi |
| 8,025,004 B2 | 9/2011 | Jones et al. |
| 8,044,415 B2 | 10/2011 | Messere et al. |
| 8,057,615 B2 | 11/2011 | Grussaute-Nghiem et al. |
| 8,083,388 B2 | 12/2011 | Sun et al. |
| 8,179,034 B2 | 5/2012 | Potts et al. |
| 8,226,282 B2 | 7/2012 | Kazaoka et al. |
| 8,297,168 B2 | 10/2012 | Jones et al. |
| 8,298,032 B2 | 10/2012 | Potts et al. |
| 8,303,147 B2 | 11/2012 | Jeon |
| 8,314,546 B2 | 11/2012 | Tchakarov |
| 8,317,381 B2 | 11/2012 | Heidinger |
| 8,339,040 B2 | 12/2012 | Bruton et al. |
| 8,349,445 B2 | 1/2013 | Jacquiod et al. |
| 8,384,520 B2 | 2/2013 | Fourreau |
| 8,403,399 B2 | 3/2013 | Kuntze et al. |
| 8,408,773 B2 | 4/2013 | Judge |
| 8,471,177 B2 | 6/2013 | Chaussade et al. |
| 8,550,536 B2 | 10/2013 | Gachter et al. |
| 8,585,263 B2 | 11/2013 | Shipman |
| 8,622,458 B2 | 1/2014 | Hache |
| 8,641,257 B2 | 2/2014 | Richardson |
| 8,646,829 B2 | 2/2014 | Crane et al. |
| 8,690,220 B2 | 4/2014 | Tsukiyama et al. |
| 8,697,186 B2 | 4/2014 | Zagdoun et al. |
| 8,727,422 B2 | 5/2014 | Iwabuchi et al. |
| 8,808,790 B2 | 8/2014 | Zagdoun et al. |
| 8,829,539 B2 | 9/2014 | Kleo et al. |
| 9,006,751 B2 | 4/2015 | Kleo et al. |
| 9,090,120 B2 | 7/2015 | Pires et al. |
| 9,210,771 B2 | 12/2015 | Day |
| 9,637,184 B1 | 5/2017 | Bennett et al. |
| 9,821,862 B2 | 11/2017 | Han et al. |
| 9,902,437 B2 | 2/2018 | Demange et al. |

(56) References Cited

U.S. PATENT DOCUMENTS

| | | |
|---|---|---|
| 2002/0037421 A1 | 3/2002 | Arnaud et al. |
| 2004/0005472 A1 | 1/2004 | Arnaud et al. |
| 2004/0191618 A1 | 9/2004 | Morin et al. |
| 2004/0218400 A1 | 11/2004 | Egashira |
| 2004/0265512 A1 | 12/2004 | Aengenheyster et al. |
| 2005/0045613 A1 | 3/2005 | Maeuser et al. |
| 2005/0147825 A1 | 7/2005 | Arnaud et al. |
| 2005/0168013 A1 | 8/2005 | Rinkiin |
| 2005/0242721 A1 | 11/2005 | Foust et al. |
| 2006/0005484 A1 | 1/2006 | Riblier et al. |
| 2006/0033978 A1 | 2/2006 | Morin et al. |
| 2006/0209551 A1 | 9/2006 | Schwenke et al. |
| 2006/0210772 A1 | 9/2006 | Bui et al. |
| 2006/0210778 A1 | 9/2006 | Benyahia et al. |
| 2007/0026235 A1 | 2/2007 | Chen et al. |
| 2007/0068375 A1 | 3/2007 | Jones et al. |
| 2007/0068376 A1 | 3/2007 | Jones et al. |
| 2007/0157671 A1 | 7/2007 | Thellier et al. |
| 2008/0241523 A1 | 10/2008 | Huignard et al. |
| 2008/0254299 A1 | 10/2008 | Blackburn et al. |
| 2008/0264930 A1 | 10/2008 | Mennechez et al. |
| 2009/0110918 A1 | 4/2009 | Jacquiod et al. |
| 2009/0308239 A1 | 12/2009 | Jones et al. |
| 2010/0026045 A1 | 2/2010 | Thomas |
| 2010/0061093 A1 | 3/2010 | Janssen et al. |
| 2010/0288117 A1 | 11/2010 | Jones et al. |
| 2011/0033667 A1 * | 2/2011 | Leconte et al. |
| 2011/0061302 A1 | 3/2011 | Barral et al. |
| 2011/0240343 A1 | 10/2011 | Zagdoun et al. |
| 2011/0241376 A1 | 10/2011 | Igura |
| 2011/0248219 A1 | 10/2011 | Zagdoun et al. |
| 2011/0250387 A1 | 10/2011 | Zagdoun et al. |
| 2012/0001027 A1 | 1/2012 | Jones et al. |
| 2012/0153670 A1 | 6/2012 | Crane et al. |
| 2012/0229907 A1 | 9/2012 | Ueda |
| 2012/0248814 A1 | 10/2012 | Tsukiyama et al. |
| 2012/0280533 A1 | 11/2012 | Gachter et al. |
| 2012/0320621 A1 | 12/2012 | Kleo et al. |
| 2013/0033894 A1 | 2/2013 | Kleo et al. |
| 2013/0051049 A1 | 2/2013 | Sato |
| 2013/0135885 A1 | 5/2013 | Anzai |
| 2013/0182451 A1 | 7/2013 | Oba et al. |
| 2013/0201709 A1 | 8/2013 | Natsume |
| 2013/0280452 A1 | 10/2013 | Nawroth et al. |
| 2013/0293105 A1 | 11/2013 | Day et al. |
| 2013/0313601 A1 | 11/2013 | Aeling et al. |
| 2013/0314935 A1 | 11/2013 | Tokieda et al. |
| 2014/0003076 A1 | 1/2014 | Suganumata et al. |
| 2014/0077525 A1 | 3/2014 | Yoshimura et al. |
| 2014/0110964 A1 | 4/2014 | Schijve et al. |
| 2014/0327269 A1 | 11/2014 | Agius et al. |
| 2015/0016132 A1 | 1/2015 | Verrat-Debailleul |
| 2015/0084370 A1 | 3/2015 | Newberry et al. |
| 2015/0153014 A1 | 6/2015 | Salter et al. |
| 2015/0273986 A1 | 10/2015 | Benyahia et al. |
| 2015/0274066 A1 | 10/2015 | Del Polo Gonzalez et al. |
| 2015/0274223 A1 | 10/2015 | Wolf et al. |
| 2017/0301981 A1 | 10/2017 | Niihara et al. |
| 2017/0349090 A1 * | 12/2017 | Dellock ............... B60J 1/00 |
| 2018/0050741 A1 | 2/2018 | Wolf et al. |
| 2018/0186220 A1 | 7/2018 | Leterrier et al. |
| 2018/0236699 A1 | 8/2018 | Schellekens et al. |
| 2018/0244136 A1 | 8/2018 | Schellekens et al. |
| 2018/0251166 A1 | 9/2018 | Escoffier et al. |
| 2018/0252382 A1 | 9/2018 | Schellekens et al. |
| 2022/0153190 A1 | 5/2022 | Seo et al. |

FOREIGN PATENT DOCUMENTS

| | | |
|---|---|---|
| CN | 1945103 A | 4/2007 |
| CN | 101130292 A | 2/2008 |
| CN | 201566450 U | 9/2010 |
| CN | 102245431 A | 11/2011 |
| CN | 103477252 A | 12/2013 |
| CN | 102458890 B | 5/2014 |
| CN | 103772921 A | 5/2014 |
| CN | 203655050 U | 6/2014 |
| CN | 203713981 U | 7/2014 |
| CN | 203844852 U | 9/2014 |
| CN | 104943603 A | 9/2015 |
| DE | 19706043 A1 | 6/1998 |
| DE | 69617705 T2 | 8/2002 |
| DE | 10147537 A1 | 4/2003 |
| DE | 69530806 T2 | 4/2004 |
| DE | 69929597 T2 | 9/2006 |
| DE | 60025815 T2 | 11/2006 |
| DE | 60027335 T2 | 1/2007 |
| DE | 60219518 T2 | 1/2008 |
| DE | 102008004942 | 6/2009 |
| DE | 102009058788 A1 | 6/2011 |
| DE | 202011110333 U1 | 8/2013 |
| EP | 0266514 A2 | 5/1988 |
| EP | 0267331 A1 | 5/1988 |
| EP | 0235447 B1 | 2/1994 |
| EP | 0453092 B1 | 8/1994 |
| EP | 0671864 A2 | 9/1995 |
| EP | 1000809 A1 | 5/2000 |
| EP | 1437215 A1 | 7/2004 |
| EP | 1494062 A2 | 1/2005 |
| EP | 1787841 A2 | 5/2007 |
| EP | 1892182 A1 | 2/2008 |
| EP | 1950492 A1 | 7/2008 |
| EP | 1992478 A1 | 11/2008 |
| EP | 2005226 A1 | 12/2008 |
| EP | 1261557 B1 | 11/2009 |
| EP | WO 2010/034944 A1 | 4/2010 |
| EP | 2219862 A1 | 8/2010 |
| EP | 2275770 A1 | 1/2011 |
| EP | 2275771 A1 | 1/2011 |
| EP | 2275772 A1 | 1/2011 |
| EP | 2287557 A1 | 2/2011 |
| EP | 1824696 B1 | 1/2012 |
| EP | 2574142 A1 | 3/2013 |
| EP | 1897412 B1 | 12/2013 |
| FR | 2792628 A1 | 10/2000 |
| FR | 2863210 A1 | 6/2005 |
| FR | 2874995 A1 | 3/2006 |
| FR | 2884148 B1 | 9/2007 |
| FR | 2961151 B1 | 6/2012 |
| FR | 2968631 A1 | 6/2012 |
| FR | 2996803 A1 | 4/2014 |
| GB | 1329505 A | 9/1973 |
| GB | 1480193 A | 7/1977 |
| GB | 2442364 A | 4/2008 |
| GB | 2513620 A | 11/2014 |
| JP | H08-050933 A | 2/1996 |
| JP | H08-207204 A | 8/1996 |
| JP | 2584764 B2 | 2/1997 |
| JP | H10-036706 A | 2/1998 |
| JP | H10-180183 A | 7/1998 |
| JP | 10-329165 A | 12/1998 |
| JP | 2000-233951 A | 8/2000 |
| JP | 2000-301985 A | 10/2000 |
| JP | 2002-518207 A | 6/2002 |
| JP | 2002-533233 A | 10/2002 |
| JP | 2002-543027 A | 12/2002 |
| JP | 2003-513840 A | 4/2003 |
| JP | 3445860 B2 | 9/2003 |
| JP | 2003-529462 A | 10/2003 |
| JP | 2004-534667 A | 11/2004 |
| JP | 2005-511473 A | 4/2005 |
| JP | 3741461 B2 | 2/2006 |
| JP | 3961583 B2 | 8/2007 |
| JP | 2008-528329 A | 7/2008 |
| JP | 2008-543706 A | 12/2008 |
| JP | 2008-545465 A | 12/2008 |
| JP | 2009-500271 A | 1/2009 |
| JP | 2009-512977 A | 3/2009 |
| JP | 4242743 B2 | 3/2009 |
| JP | 4251678 B2 | 4/2009 |
| JP | 4440641 B2 | 3/2010 |
| JP | 2010-188792 A | 9/2010 |
| JP | 2010-247676 A | 11/2010 |
| JP | 2010-260519 A | 11/2010 |

(56) References Cited

FOREIGN PATENT DOCUMENTS

| | | |
|---|---|---|
| JP | 2011-051544 A | 3/2011 |
| JP | 2011-057188 A | 3/2011 |
| JP | 2011-514849 A | 5/2011 |
| JP | 2011-121479 A | 6/2011 |
| JP | 2011-126388 A | 6/2011 |
| JP | 4700804 B2 | 6/2011 |
| JP | 2011-136606 A | 7/2011 |
| JP | 4754044 B2 | 8/2011 |
| JP | 4771262 B2 | 9/2011 |
| JP | 2011-219000 A | 11/2011 |
| JP | 2012-030654 A | 2/2012 |
| JP | 2012-503716 A | 2/2012 |
| JP | 2012-503852 A | 2/2012 |
| JP | 2012-046109 A | 3/2012 |
| JP | 2012-061957 A | 3/2012 |
| JP | 2012-131375 A | 7/2012 |
| JP | 5015764 B2 | 8/2012 |
| JP | 2012-206612 A | 10/2012 |
| JP | 2012-206614 A | 10/2012 |
| JP | 5054376 B2 | 10/2012 |
| JP | 5107242 B2 | 12/2012 |
| JP | 2013-006570 A | 1/2013 |
| JP | 5128733 B2 | 1/2013 |
| JP | 2013-056669 A | 3/2013 |
| JP | 5160900 B2 | 3/2013 |
| JP | 2013-517989 A | 5/2013 |
| JP | 2013-517990 A | 5/2013 |
| JP | 2013-124006 A | 6/2013 |
| JP | 5235658 B2 | 7/2013 |
| JP | 5243447 B2 | 7/2013 |
| JP | 2013-230716 A | 11/2013 |
| JP | 2013-230717 A | 11/2013 |
| JP | 2013-230723 A | 11/2013 |
| JP | 5479732 B2 | 4/2014 |
| JP | 2014-076707 A | 5/2014 |
| JP | 2014-091342 A | 5/2014 |
| JP | 2014-101055 A | 6/2014 |
| JP | 2014-104790 A | 6/2014 |
| JP | 2014-159243 A | 9/2014 |
| KR | 2008-0034314 A | 4/2008 |
| WO | WO 1987/003846 A1 | 7/1987 |
| WO | WO 1994/022779 A2 | 10/1994 |
| WO | WO 1998/047703 A1 | 10/1998 |
| WO | WO 1999/003678 A1 | 1/1999 |
| WO | WO 1999/065678 A1 | 12/1999 |
| WO | WO 2000/037374 A1 | 6/2000 |
| WO | WO 2000/057243 A1 | 9/2000 |
| WO | WO 2000/067530 A1 | 11/2000 |
| WO | WO 2001/026924 A1 | 4/2001 |
| WO | WO 2002/002472 A1 | 1/2002 |
| WO | WO 2002/072330 A1 | 9/2002 |
| WO | WO 2003/010105 A1 | 2/2003 |
| WO | WO 2003/026869 A1 | 4/2003 |
| WO | WO 2006/030165 A1 | 3/2006 |
| WO | WO 2006/091959 A2 | 8/2006 |
| WO | WO 2066/095005 A1 | 9/2006 |
| WO | WO 2006/135832 A2 | 12/2006 |
| WO | WO 2007/003849 A2 | 1/2007 |
| WO | WO 2007/119019 A1 | 10/2007 |
| WO | WO 2008/104728 A2 | 9/2008 |
| WO | WO 2008/132397 A2 | 11/2008 |
| WO | WO 2009/074266 A1 | 6/2009 |
| WO | WO 2010/034945 A1 | 4/2010 |
| WO | WO 2010/034949 A1 | 4/2010 |
| WO | WO 2010/034950 A1 | 4/2010 |
| WO | WO 2010/049638 A1 | 5/2010 |
| WO | WO 2009/056775 A2 | 8/2010 |
| WO | WO 2011/092419 A1 | 4/2011 |
| WO | WO 2011/092420 A2 | 4/2011 |
| WO | WO 2011/092421 A1 | 4/2011 |
| WO | WO 2011/054826 A1 | 5/2011 |
| WO | WO 2011/067541 A1 | 6/2011 |
| WO | WO 2011/157911 A1 | 12/2011 |
| WO | WO 2012/055873 A2 | 5/2012 |
| WO | WO 2012/080621 A1 | 6/2012 |
| WO | WO 2012/085433 A1 | 6/2012 |
| WO | WO 2012/098330 A1 | 7/2012 |
| WO | WO 2012/104530 A1 | 8/2012 |
| WO | WO 2012/126708 A1 | 9/2012 |
| WO | WO 2012/168009 A1 | 12/2012 |
| WO | WO 2012/168628 A1 | 12/2012 |
| WO | WO 2012/168646 A1 | 12/2012 |
| WO | WO 2013/017790 A1 | 2/2013 |
| WO | WO 2013/017791 A1 | 2/2013 |
| WO | WO 2013/017792 A1 | 2/2013 |
| WO | WO 2013/054059 A1 | 4/2013 |
| WO | WO 2013/068678 A1 | 5/2013 |
| WO | WO 2013/068679 A1 | 5/2013 |
| WO | WO 2013/079832 A1 | 6/2013 |
| WO | WO 2013/087518 A1 | 6/2013 |
| WO | WO 2013/093301 A1 | 6/2013 |
| WO | WO 2013/110885 A1 | 8/2013 |
| WO | WO 2013/121134 A1 | 8/2013 |
| WO | WO 2013/153303 A1 | 10/2013 |
| WO | WO 2013/167832 A1 | 11/2013 |
| WO | WO 2014/009630 A1 | 1/2014 |
| WO | WO 2014/020249 1 | 2/2014 |
| WO | WO 2014/037643 A1 | 3/2014 |
| WO | WO 2014/037671 A1 | 3/2014 |
| WO | WO 2014/057200 A1 | 4/2014 |
| WO | WO 2014/060338 A1 | 4/2014 |
| WO | WO 2015/052655 A1 | 4/2015 |
| WO | WO 2015/079186 A1 | 6/2015 |
| WO | WO 2017/042703 A1 | 3/2017 |

OTHER PUBLICATIONS

U.S. Appl. No. 61/887,687, filed Oct. 7, 2013.
International Patent Application No. PCT/EP2011/068667; Int'l Search Report; dated Jun. 1, 2012; 5 pages.
International Patent Application No. PCT/EP2011/068667; Int'l Preliminary Report on Patentability; dated Apr. 30, 2013; 12 pages.
International Patent Application No. PCT/DE2005/002068; Int'l Preliminary Report on Patentability; dated May 22, 2007; 5 pages.
Bauer D.R.; "Application of Failure Models for Predicting Weatherability in Automotive Coatings"; American Chemical Society; Chapter 24; 1999; p. 378-395.
Anand et al.; "Role of adhesives in the dimensional stability of polycarbonate structural panels"; Int'l Journal of Adhesion & Adhesives; vol. 27; 2007; p. 338-350.
International Patent Application No. PCT/IB2016/055338; Int'l Search Report and the Written Opinion; dated Nov. 25, 2016; 15 pages.
International Patent Application No. PCT/IB2016/055338; Int'l Preliminary Report on Patentability; dated Mar. 22, 2018; 10 pages.
International Patent Application No. PCT/IB2016/055334; Int'l Written Opinion and the Search Report; dated Nov. 22, 2016; 10 pages.
International Patent Application No. PCT/IB2016/055334; Int'l Preliminary Report on Patentability; dated Mar. 22, 2018; 7 pages.
International Patent Application No. PCT/IB2016/055333; Int'l Written Opinion and the Search Report; dated Jan. 2, 2017; 11 pages.
International Patent Application No. PCT/IB2016/055333; Int'l Preliminary Report on Patentability; dated Mar. 22, 2018; 7 pages.
International Patent Application No. PCT/IB2016/055332; Int'l Search Report and the Written Opinion; dated Jan. 2, 2017; 12 pages.
International Patent Application No. PCT/IB2016/055332; Int'l Preliminary Report on Patentability; dated Mar. 22, 2018; 8 pages.
International Patent Application No. PCT/IB2016/057013; Int'l Search Report and the Written Opinion; dated Aug. 8, 2017; 13 pages.
International Patent Application No. PCT/IB2016/057013; Int'l Preliminary Report on Patentability; dated Jun. 7, 2018; 8 pages.

* cited by examiner

ILLUMINATED GRAPHIC IN AN AUTOMOTIVE PLASTIC GLAZING

CROSS REFERENCE TO RELATED APPLICATIONS

This application is a continuation of U.S. patent application Ser. No. 16/822,187, filed Mar. 18, 2020, which is a continuation of U.S. patent application Ser. No. 15/776,200, filed on May 15, 2018, which is the U.S. National Stage Entry of International Application PCT/IB2016/057013, filed Nov. 21, 2016, which claims the benefit of U.S. Provisional Application No. 62/258,648, filed Nov. 23, 2015, the disclosures of all of which are incorporated by reference in their entireties.

BACKGROUND

Technical Field

The present disclosure relates to lighting systems for vehicle windows having plastic glazing.

Technical Background

Vehicles such as sedans, coupes, sports utility vehicles, vans, hatchbacks, and the like typically include one or more of front, side, quarter and rear window structures. Moreover, such vehicles include one or more light assemblies (e.g., a brake light, a puddle light). These parts and other parts may add to the cost and complexity of assembling a vehicle.

In this regard, light assemblies in vehicles include a large number of separate components. For example, a typical vehicle may have several different types of lights, including, for example, parking lights, turn indicator lights, brake lights, and the like. Each of these lights may be made from many parts. These parts add to the cost and complexity of assembling a vehicle. Accordingly, as recognized in U.S. Pat. No. 7,048,423 ("the '423 patent"), it desirable to have a lighting assembly with fewer parts. The '423 patent discloses an integrated light assembly including a plurality of lamps 210, 216 enclosed in a housing 202, which may serve as a lens for the lamps, and mounted on a substrate 204. Such portions of a light assembly may add to the overall weight of a vehicle, and the overall complexity and cost of manufacturing and assembling a vehicle. The above-noted problems with conventional light assemblies are compounded by recent trends to increase the number of lights provided on vehicles. For example, lights provided for aesthetic purposes and utility purposes.

The present disclosure aims to solve these problems and other problems in the prior art.

SUMMARY

In accordance with the purpose(s) of the disclosure, as embodied and broadly described herein, this disclosure, in one aspect, relates to vehicle components, including windows and lighting systems of windows with plastic glazing.

In one aspect, a plastic glazing of a window of a vehicle having a light feature includes a first vehicle window glazing component, a second vehicle window glazing component molded onto the first vehicle window glazing component, a light unit configured to produce light for the light feature, the light unit being integrated with at least one of the following: the first vehicle window glazing component and the second vehicle window glazing component, and the light unit further configured to direct the light for the light feature through or from at least one of the following: the first vehicle window glazing component and the second vehicle window glazing component, wherein the plastic glazing is of one-piece molded plastic construction, and wherein at least one of the first vehicle window glazing component and the second vehicle window glazing component is translucent or transparent.

Another aspect, a process of manufacturing a plastic glazing of a window of a vehicle having a light feature includes molding a first vehicle window glazing component, molding a second vehicle window glazing component molded onto the first vehicle window glazing component, integrating a light unit configured to produce light for the light feature with at least one of the following: the first vehicle window glazing component and the second vehicle window glazing component, and arranging the light unit to direct the light for the light feature through or from at least one of the following: the first vehicle window glazing component and the second vehicle window glazing component wherein at least one of the first vehicle window glazing component and the second vehicle window glazing component is translucent or transparent.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The foregoing summary, as well as the following detailed description, is better understood when read in conjunction with the appended drawings. There is shown in the drawings exemplary aspects, and the present disclosure is not intended to be limited to the specific aspects and methods disclosed.

DESCRIPTION

Figure 1:
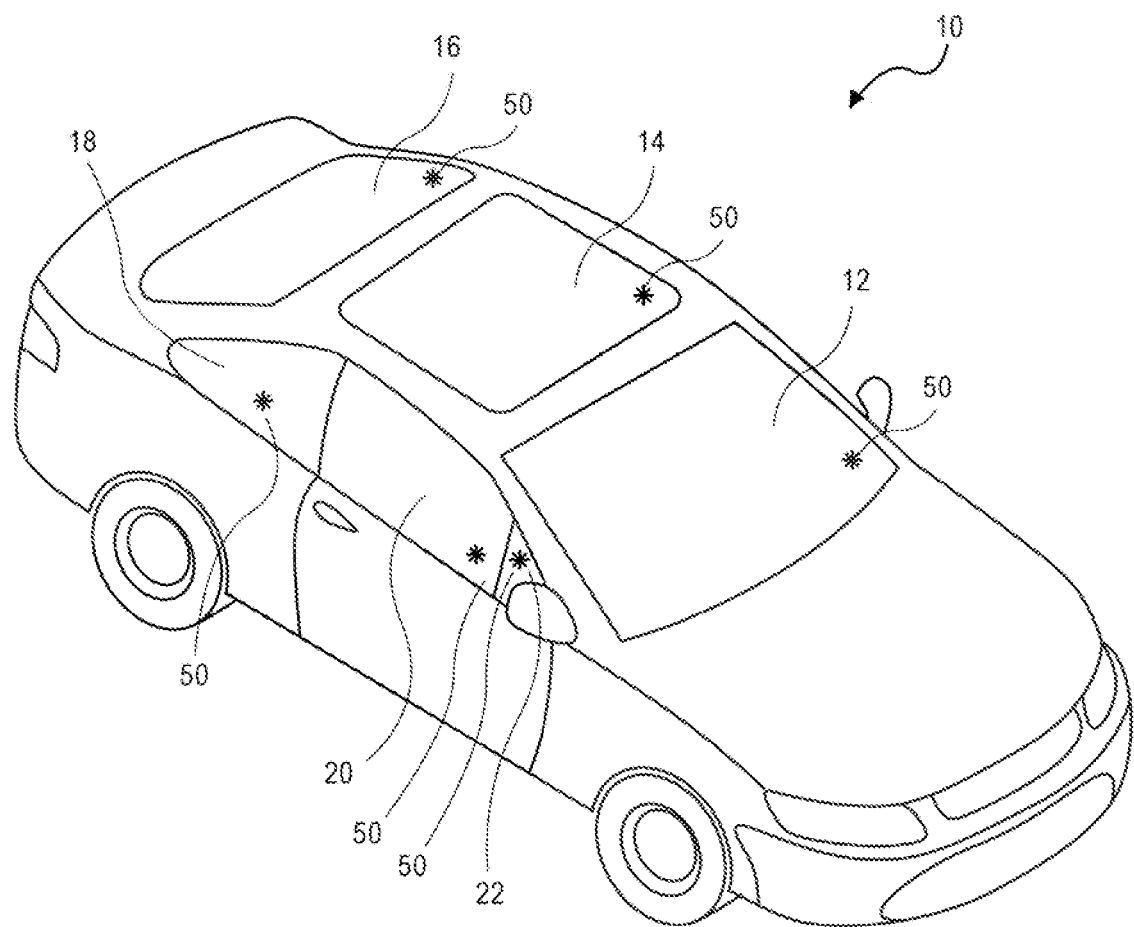
FIG. 1 illustrates a vehicle having windows constructed with plastic glazing having light assemblies according to an aspect of the present disclosure.

Aspects of the disclosure will now be described in detail with reference to the drawings, wherein like reference numerals designate identical or corresponding parts throughout the several views, unless specified otherwise.

Devices and methods disclosed herein provide a window having a plastic glazing having a one-piece monolithic construction. The window may support a light assembly attached to the window using integrated fasteners, separate fasteners, screws, other connectors, or an adhesive. The light assembly may provide a lighted feature providing aesthetic and/or utility functions. In order to reduce the number of separate components of a vehicle, devices and methods disclosed herein may provide an integrated window assembly including and/or integrating one or more other vehicle components. For example, systems and methods disclosed herein may provide a window having a plastic glazing. The plastic glazing of the window may be constructed of a thermoplastic polymer including a portion that is clear. In other devices and methods disclosed herein, additional vehicle components may also be included in the plastic glazing. Such components may include, for example, a colored translucent portion for a light unit; a cavity and fixation unit (e.g., a threaded hole, a hook or clip) for supporting a light unit; a textured and/or raised region for a logo or other marking; and the like.

Devices and methods disclosed herein may also provide a method of manufacturing a window or, specifically, a plastic glazing of a window. Such systems and methods may provide a method of producing a plastic glazing using multi-shot injection molding techniques. The method further includes providing a light assembly attached to the window using integrated fasteners, separate fasteners, screws, other connectors, or an adhesive. The light assembly may provide a lighted feature providing aesthetic and/or utility functions. In certain aspects of the disclosure, a plastic glazing of a window may be formed via a two-shot injection molding process. In a first shot, a clear thermoplastic polymer may be injected to form a shell or outline of the plastic glazing. In a second shot, a colored thermoplastic polymer may be injected to form one or more colored regions in the plastic glazing.

FIG. 1 illustrates a vehicle having windows constructed with plastic glazing and light assemblies according to an aspect of the present disclosure. In particular, FIG. 1 illustrates a vehicle 10 having one or more of a front window 12 or windshield, side windows 20, rear quarter windows 18, a rear window 16, front quarter windows 22, and a panoramic window 14 also known as a moonroof, sunroof, and the like. Other types of windows are contemplated as well for different types of vehicles.

One or more of the Windows 12, 14, 16, 18, 20, 22 of the vehicle 10 may include light assemblies that generate a light feature 50. The light assemblies may be implemented to provide the light feature 50 with aesthetic and/or utility functions. In one aspect, the light assembly may provide the light feature 50 with a warning light for pedestrians or other drivers. In one aspect, the light assembly may provide the light feature 50 with a side signature light based on a design influence and/or may be associated with a brand identity. In one aspect, the light assembly may provide the light feature 50 with a welcome or courtesy light configured to light the surroundings of the vehicle 10. In one aspect, the light assembly may provide the light feature 50 with an outside light that lights the exterior of the vehicle as the driver approaches and operates a key fob. In one aspect, the light assembly may provide the light feature 50 with an interior reading light providing additional light for the driver or passengers. In one aspect, the light assembly may provide the light feature 50 with an individual customizable light that is configured to be customizable by the driver. In one aspect, the light assembly may provide the light feature 50 with light operating in response to connectivity to other vehicles or drivers providing a gesture or wink to the same.

In one aspect, the light assembly may provide the light feature 50 with a side marker light. For example, the side marker light may be red or amber. In one aspect, lighting functions indicating remaining battery charge of an electric vehicle or a hybrid electric vehicle or other novel functions may be implemented using a marker light in different colors such as green, blue or the like. In one aspect, the light assembly may provide the light feature 50 with a reflex reflector that includes light reflected by total internal reflection. In one aspect, the light assembly may provide the light feature 50 with a private color/shadow effect that is customizable. In one aspect, the light assembly may provide the light feature 50 with a chameleon effect that generates a color or colors as desired. In one aspect, the light assembly may provide the light feature 50 with a flash line having plural flashing lights.

In one aspect, the light assembly may provide the light feature 50 with an in-molded micro images and/or macro images. In one aspect, the light assembly may provide the light feature 50 with an ambient light that may be arranged inside of cockpit/cabin of the vehicle 10. In one aspect, the light assembly may provide the light feature 50 with a cargo light in a cargo section of the vehicle 10. In one aspect, the light assembly may provide the light feature 50 with a park mode light. In one aspect, the light assembly may provide the light feature 50 with a caution light, for instance to signal an opened door. In one aspect, the light assembly may provide the light feature 50 with a local laser marking. In one aspect, the light assembly may provide the light feature 50 with a solid (i.e. white) 2K (two component molding that may include different colors, different transparencies, different materials, and the like) area. In one aspect, the light assembly may provide the light feature 50 with a surface texturing, a laser marking, a local painting, an inkjet printing, or the like. In one aspect, the light assembly may provide the light feature 50 with a transparent or diffused 2K area. In one aspect, the light assembly may provide the light feature 50 on an aerodynamic spoiler. In one aspect, the light assembly may provide the light feature 50 on a roof pillar. In one aspect, the light assembly may provide the light feature 50 on a D pillar. In one aspect, the light assembly may provide the light feature 50 on a panoramic roof. In one aspect, the light assembly may provide the light feature 50 with a photochromic light. In one aspect, the light assembly may provide the light feature 50 with a 3K (three component molding that may include different colors, different transparencies, different materials, and the like) rear quarter window design feature that may be implemented with a first component glazing, second component housing and a third component design feature. In one aspect, the light assembly may provide the light feature 50 with a security light. In one aspect, the light assembly may provide the light feature 50 with a colored light in accordance with certain international standards governing vehicle lighting such as, for example, ECE Regulation No. 48 and SAE Standard J578. In one aspect, the light assembly may provide the light feature 50 with a light defined in ECE Regulation No. 48. In one aspect, the light assembly may provide the light feature 50 with a brake light, a turn signal light, a running light, a reverse light, a fog light and/or the like.

Figure 2:
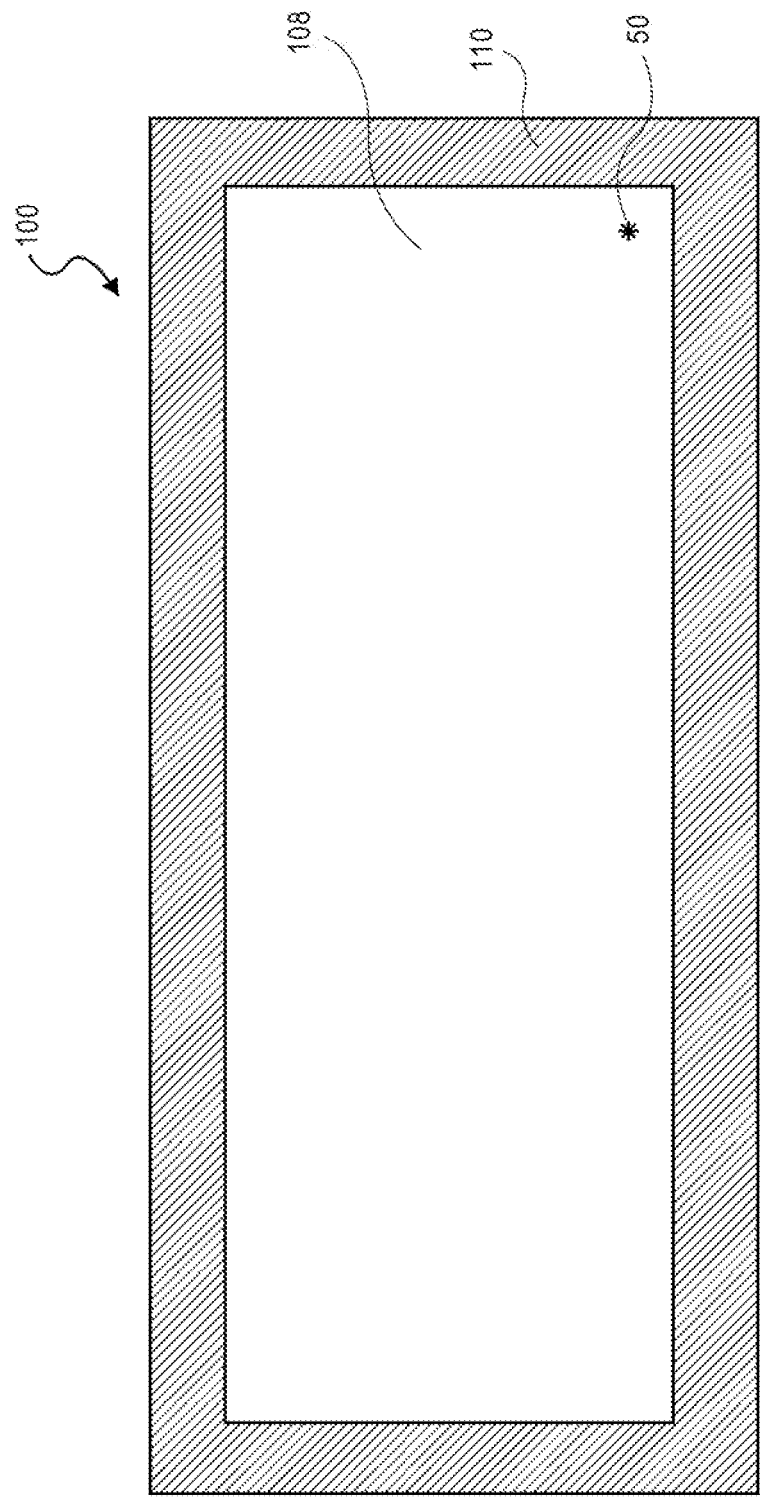
FIG. 2 illustrates a front view of a first exemplary plastic glazing of a window in accordance with an aspect of the present disclosure.

FIG. 2 illustrates a front view of a first exemplary plastic glazing of a window in accordance with an aspect of the present disclosure. Referring now to FIG. 2, an exemplary plastic glazing 100 of a window of a vehicle is depicted. The plastic glazing 100 may be a one-piece monolithic structure formed of one or more thermoplastic polymers. Examples of suitable thermoplastic polymers include: polycarbonate, polyester carbonate, poly methyl methacrylate, and the like. According to one aspect of the disclosure, the plastic glazing 100 may be formed of a polycarbonate. The plastic glazing 100 can have an outer surface that is seamless, i.e., lacking any visual openings, junctions, disruptions, interruptions, gaps, or the like. The rectangular shape of the plastic glazing 100 is merely exemplary, the plastic glazing 100 may be implemented with any window shape. The shape of the plastic glazing may be flat, but it may also be curved to various degrees of complexity in three dimensions.

The plastic glazing 100 may be implemented in any type of window including the front window 12 or windshield of a vehicle, the side windows 20 of a vehicle, rear quarter windows 18 of a vehicle, a rear window 16 of a vehicle, front quarter windows 22, and a panoramic window 14 of a vehicle, and the like. Other types of windows are contemplated for different types of vehicles. The plastic glazing 100 also includes a clear transparent portion 108 that functions as a window of the vehicle 10. The plastic glazing 100 may include a portion 110. The portion 110 may be colored, translucent, non-transparent (i.e. opaque) and may be strategically placed to hide one or more structures positioned behind the plastic glazing 100.

With further reference to FIG. 2, the plastic glazing 100 may be further configured to externally emit light from the vehicle 10 associated with the light feature 50. Light from the light feature 50 may be emitted through the clear transparent portion 108 and/or the portion 110. In one aspect, the plastic glazing 100 may be configured to internally emit light within the vehicle 10 associated with the light feature 50.

Figure 3:
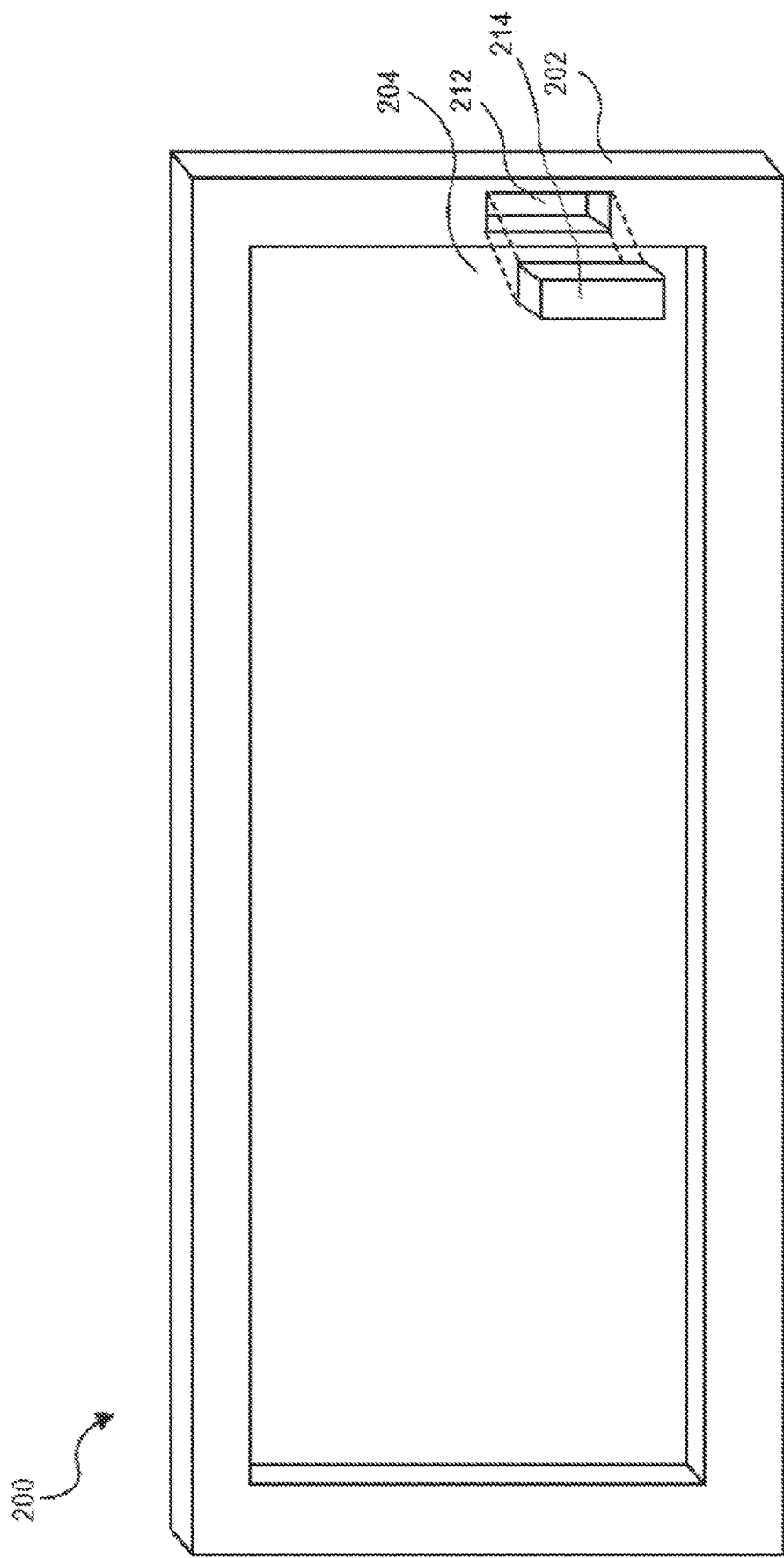
FIG. 3 illustrates a front view of a housing unit in accordance with an aspect of the present disclosure.

FIG. 3 illustrates a housing unit in accordance with an aspect of the present disclosure. Referring now to FIG. 3, the housing unit 200 may be formed of a fiber-reinforced polymer. According to a preferred aspect of the disclosure, the housing unit 200 may be formed of a long-glass fiber-reinforced polypropylene such as, for example, SABIC® STAMAX™ plastic. The housing unit 200 may include a frame portion 202 and opening 204.

The plastic glazing 100 may be secured to the housing unit 200 using an adhesive and/or a mechanical fastening system (e.g., a screw, bolt, and/or clip fastening system). The mechanical fastening system may be integrated in the molded parts or separate. The adhesive used may be a commercially available adhesive that is typically used in the automotive industry for the adhesive bonding of plastic components. Such adhesives may include, for example, wet adhesives, tape-based adhesives, contact adhesives, hot-melt adhesives, reaction adhesives or the like. The thickness of the adhesive required may vary depending on the specific geometries of the plastic glazing 100 and the housing unit 200. When the adhesive is a hot-melt adhesive that can be processed under thermoplastic conditions, it may be possible to bond the plastic glazing 100, the housing unit 200, and the hot-melt adhesive together during a multi-shot injection molding process. In some aspects, the disclosure contemplates implementation without the housing unit 200.

As depicted in FIG. 3, the housing unit 200 may include one or more cavities for receiving a light unit 214. In particular, the housing unit 200 may include a cavity 212 for receiving the light unit 214. The light unit 214 can be fixed directly in the housing unit 200 via access doors, using mechanical fasteners that are integrated in the molded parts or separate (e.g., screw, bolt, and the like), adhesive and/or the like. The cavity 212 can prevent light from the light unit 214 from bleeding outside of a confined space. As such, additional cavities (not depicted) may be formed next to the cavity 212 for holding additional light units 214, and the cavities would prevent the light generated by one light unit 214 from bleeding into a space reserved for another light unit 214.

In another aspect, the light unit 214 may be attached externally to the housing unit 200. The light unit 214 can be fixed directly onto the housing unit 200 via access doors, using mechanical fasteners that are integrated in the molded parts or separate (e.g., screw, bolt, and the like), adhesive and/or the like.

In a particular aspect, the light unit 214 may be molded into the housing unit 200 and/or the light unit 214 may be over-molded onto the housing unit 200. In this regard, the light unit 214 may be arranged in the housing unit 200 such that light is emitted through the plastic glazing 100. For example, the light unit 214 may be implemented as one or more light emitting diodes (LEDs). Control and power wiring may be molded into the housing unit 200. Other types of lighting units are contemplated as well. In this aspect, the light unit 214 may be able to generate a light feature 50 as described above with reduced packaging space compared to traditional lighting solutions.

In another aspect, the light unit 214 may be molded into the plastic glazing 100 and/or the light unit 214 may be over-molded onto the plastic glazing 100. In this regard, the light unit 214 may be arranged in the plastic glazing 100 such that light is emitted through the plastic glazing 100. For example, the light unit 214 may be implemented as one or more light emitting diodes (LEDs). Control and power wiring may be molded into the plastic glazing 100. Other types of lighting units are contemplated as well. In this aspect, the light unit 214 may be able to generate a light feature 50 as described above with reduced packaging space compared to traditional lighting solutions. In a further aspect, the plastic glazing 100 may provide a hermetically sealed encapsulation of the light unit 214 including the LEDs. The light unit 214 may further include electronic circuitry that includes conductive traces within the plastic glazing 100. The electronic circuitry may thereby effectively form a printed circuit board (PCB), or part thereof, within the plastic glazing 100. The LEDs of the light unit 214 may be coupled to the conductive traces to provide power and signaling to effectuate activation and/or deactivation of the LEDs of the light unit 214 via the conductive traces and may be controlled by dedicated hardware as defined herein. In a further aspect, the housing unit 200 may provide a hermetically sealed encapsulation of the light unit 214 including the LEDs in a manner similar to the encapsulation with respect to the plastic glazing 100 described above. In yet a further aspect, the housing unit 200 and the plastic glazing 100 may provide a hermetically sealed encapsulation of the light unit 214 including the LEDs in a manner similar to the encapsulation with respect to the plastic glazing 100 described above.

Figure 4:
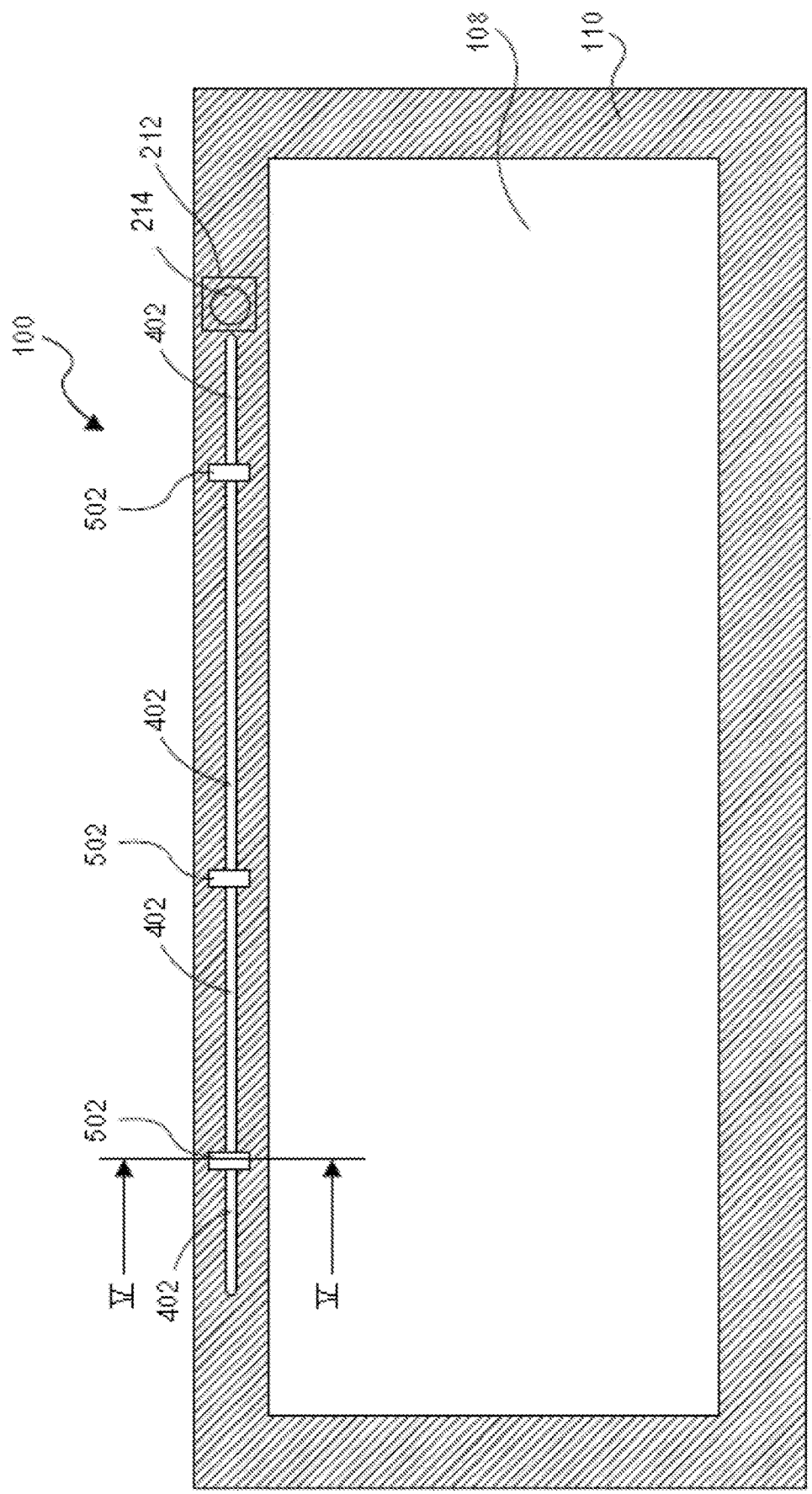
FIG. 4 illustrates a back view of a first exemplary window glazing depicted in FIG. 2 with a lighting system in accordance with an aspect of the present disclosure.
Figure 5:
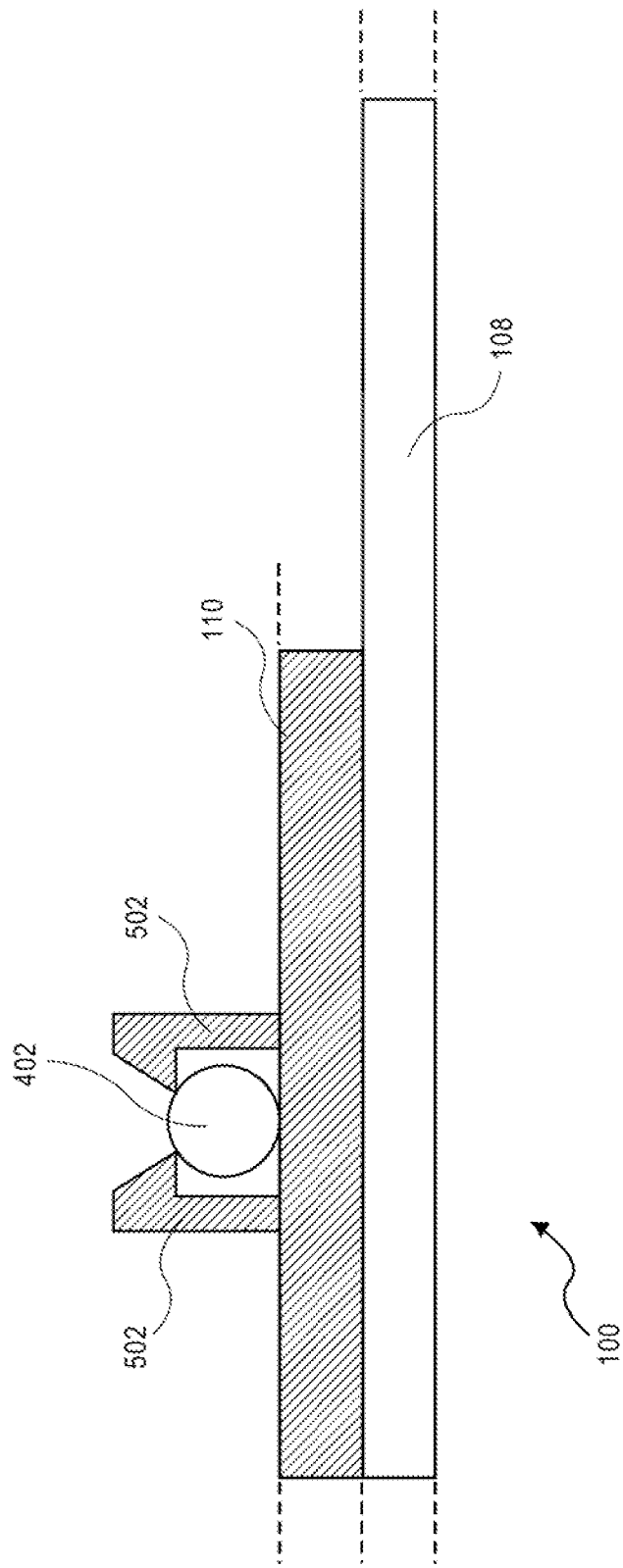
FIG. 5 is a partial cross-sectional view of the first exemplary window glazing depicted in FIG. 4 with a lighting system in accordance with an aspect of the present disclosure.

FIG. 4 illustrates a first exemplary window glazing depicted in FIG. 1 with a lighting system in accordance with an aspect of the present disclosure; and FIG. 5 is a partial cross-sectional view of the first exemplary window glazing depicted in FIG. 4 with a lighting system in accordance with an aspect of the present disclosure. In particular, FIG. 4 shows the cavity 212 arranged in or below the plastic glazing 100 having a light unit 214 arranged therein. The light unit 214 may further include power and signal connections (not shown) that may be arranged within the housing unit 200.

In one aspect, the light unit 214 may be molded into the housing unit 200, molded into the plastic glazing 100, or both. In one aspect, the light unit 214 may be arranged into a molded cavity 212 of the housing unit 200, arranged into a molded cavity in the plastic glazing 100, or both. In one aspect, the light unit 214 may be attached to the housing unit 200, attached to the plastic glazing 100, or both.

The light unit 214 may generate and provide light to a light guide 402. The light guide 402 may extend across the plastic glazing 100 on the portion 110. Alternatively or additionally, the light guide 402 may extend across the clear transparent portion 108. Alternatively or additionally, the light guide 402 may extend across the housing unit 200.

The light guide 402 may receive light from the light unit 214. The light guide 402 may be configured to transmit the light from the light unit 214 and deliver the light to a predetermined location for providing the light feature 50. In this regard, the light guide 402 may be configured to simply deliver the light to an end portion thereof.

Alternatively or additionally, the light guide 402 may be configured to emit the light along its length as the light feature 50. The light guide 402 is shown with a linear or straight construction. However, the light guide 402 may have any desired shape to provide the light feature 50 as desired.

As shown in FIG. 5, the light guide 402 may be held by molded components 502. The molded components 502 may be manufactured in the same molding shot as the portion 110 thus reducing manufacturing complexity and cost. The molded components 502 may extend from the portion 110 and terminate with hook portions as shown in FIG. 5. Other constructions of the molded components 502 configured to hold the light guide 402 are contemplated as well. Alternatively, the light guide 402 may be simply attached to the portion 110 with adhesive, mechanical fasteners, or the like. The mechanical fasteners may be integrated in the molded parts or separate (e.g., screw, bolt, and the like).

In another aspect, the light guide 402 may be held by molded components 502 arranged on the housing unit 200. The molded components 502 may be manufactured in the same molding shot as the housing unit 200 thus reducing manufacturing complexity and cost. The molded components 502 may extend from the housing unit 200 and terminate with hook portions. Other constructions of the molded components 502 configured to hold the light guide 402 are contemplated as well. Alternatively, the light guide 402 may be simply attached to the housing unit 200 with adhesive, mechanical fasteners, or the like. The mechanical fasteners may be integrated in the molded parts or separate (e.g., screw, bolt, and the like).

Figure 6:
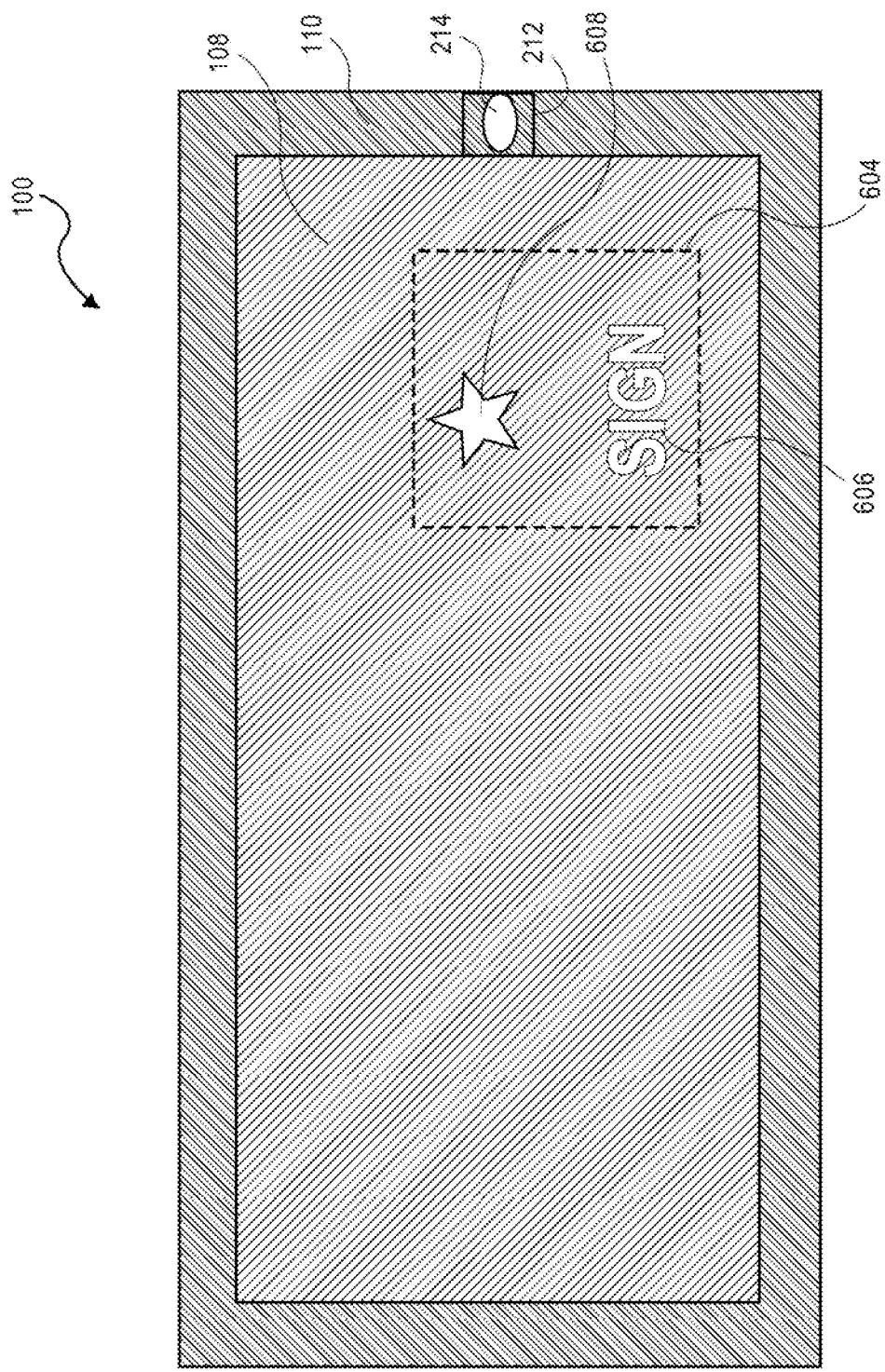
FIG. 6 illustrates a front view of a second exemplary window glazing with a lighting system in accordance with an aspect of the present disclosure.

FIG. 6 illustrates a second exemplary window glazing with a lighting system in accordance with an aspect of the present disclosure. In particular, FIG. 6 shows the cavity 212 arranged in and/or below the plastic glazing 100 having the light unit 214 arranged therein. The light unit 214 may further include power and signal connections (not shown) that may be arranged within the housing unit 200 and/or the plastic glazing 100. In one aspect, the light unit 214 may be molded into the housing unit 200, molded into the plastic glazing 100, or both. In one aspect, the light unit 214 may be arranged into a molded cavity 212 of the housing unit 200, arranged into a molded cavity in the plastic glazing 100, or both. In one aspect, the light unit 214 may be attached to the housing unit 200, attached to the plastic glazing 100, or both.

The light unit 214 may emit light within the clear transparent portion 108 through an edge adjacent to the cavity 212. Alternatively or additionally, the light unit 214 may be arranged such that it emits light onto a surface of the clear transparent portion 108. In either case, the light will be transmitted to a portion 604 on the clear transparent portion 108. The portion 604 may include an image 608 and/or text 606 that receive the light emitted from the light unit 214. The image 608 and/or the text 606 may be formed by a laser marked image or a textured surface. In either case, the image 608 and/or the text 606 may receive the light emitted from the light unit 214 and illuminate the image 608 and/or the text 606 due to the laser marking or textured surface. In one aspect, the image 608 and/or the text 606 may receive the light emitted from the light unit 214 and scatter, diffuse, and/or reflect the light in order to illuminate the image 608 and/or the text 606 due to the laser marking or textured surface.

In one aspect, the image 608 and/or the text 606 may be a raised or embossed region of the plastic glazing 100 that surround it. In one aspect, the image 608 and/or the text 606 can be selected to be clear, colored, transparent, translucent, and/or non-transparent. In one aspect, the image 608 and/or the text 606 is translucent such that a light disposed behind the plastic glazing 100 may shine through the translucent portion to increase the visibility, especially when it is dark. In one aspect, the image 608 and/or the text 606 may be formed of a thermoplastic polymer and may be formed as part of an injection molding process for forming the plastic glazing 100.

Figure 7:
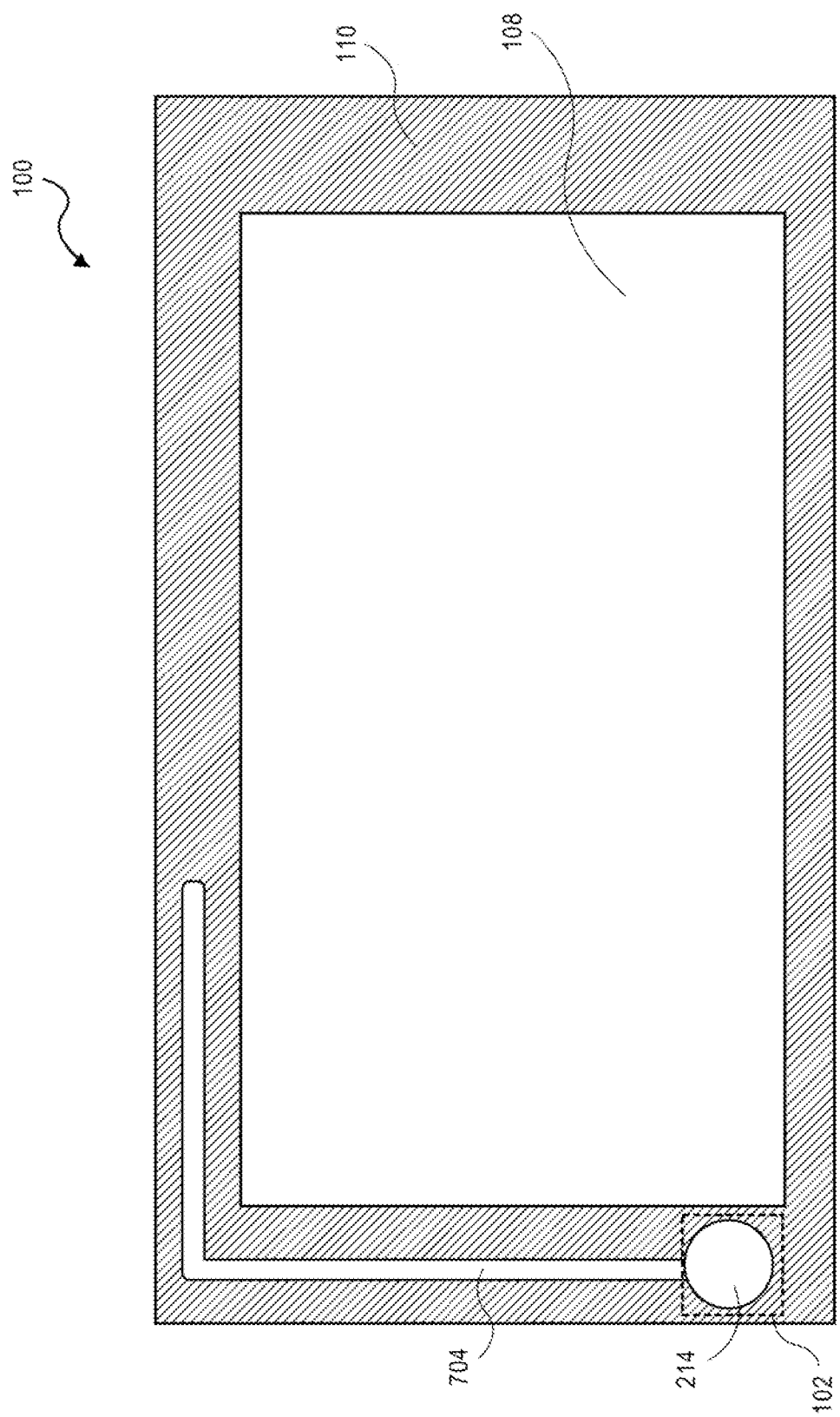
FIG. 7 illustrates a third exemplary window glazing with a lighting system in accordance with an aspect of the present disclosure.

FIG. 7 illustrates a third exemplary window glazing with a lighting system in accordance with an aspect of the present disclosure. The plastic glazing 100 may include a first clear or colored portion 102 that functions as a portion of a tail lamp, an axillary brake light, a courtesy light, a brake light or the like of the vehicle 10. Light emitted from the light unit 214 through the portions 102 of the plastic glazing 100 may be emitted as a colored light in accordance with certain international standards governing vehicle lighting such as, for example, ECE Regulation No. 48 and SAE Standard J578. While the portion 102 and the light unit 214 may produce a red light, one of ordinary skill in the art would appreciate that the portion 102 and the light unit 214 may also be designed to produce lights having other colors, such as, for example, yellow or amber. These colors are also defined in ECE Regulation No. 48 as well as in other international standards. Of course, other colors may be emitted by the portion 102 in conjunction with the light unit 214.

Figure 8:
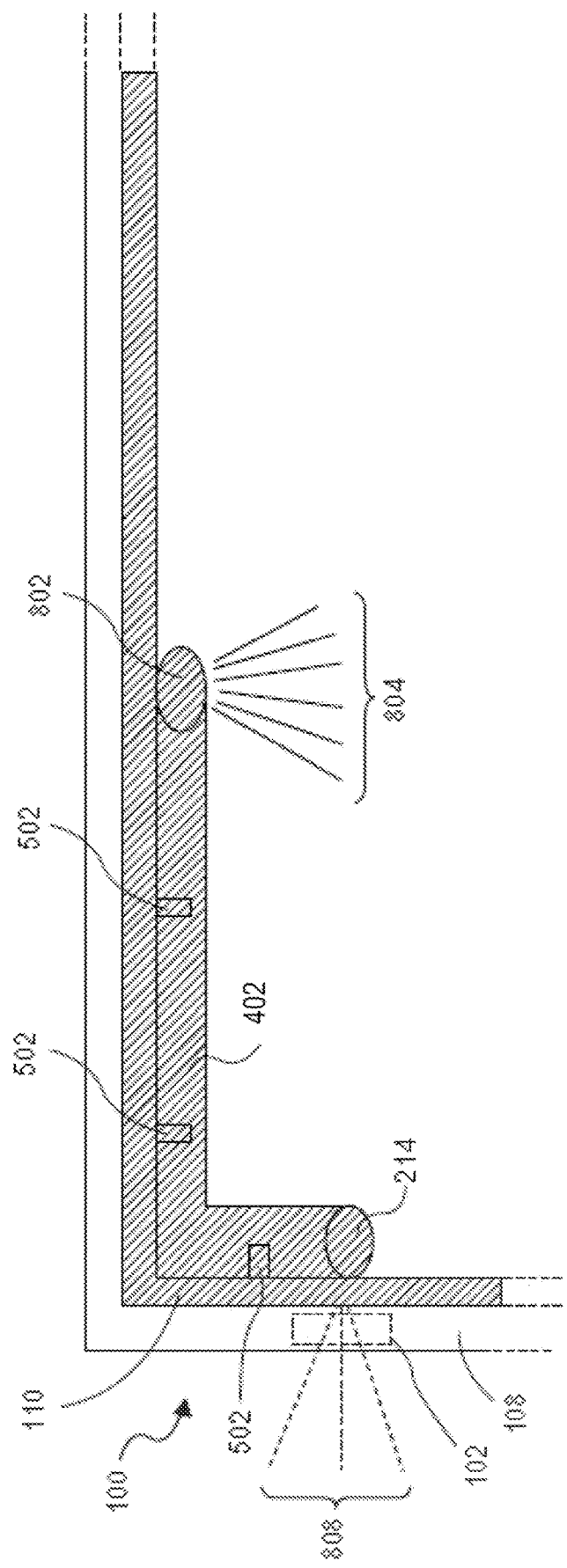
FIG. 8 illustrates a partial cross-sectional view of a first aspect of FIG. 7.

FIG. 8 illustrates a cross-sectional view of a first aspect of FIG. 7. The light unit 214 may further provide light to the light guide 402 as described previously. The light guide 402 being attached and arranged as described previously as well. The light guide 402 may terminate at an end 802 with a configuration to emit a light 804 internally within the vehicle 10. The light 804 providing the light feature 50 as previously described. For example, the light 804 providing the light feature 50 may include a welcome or courtesy light, an interior reading light, an individual customizable light, an ambient light, a cargo light, a panoramic roof light, or the like. The light 804 may have a color consistent with the light unit 214. Alternatively, the light 804 may be emitted through a color portion arranged in the light guide 402, the end 802, or the like in order to provide a desired color. The light unit 214 may also emit a light 808 through the portion 102 as noted above.

Figure 9:
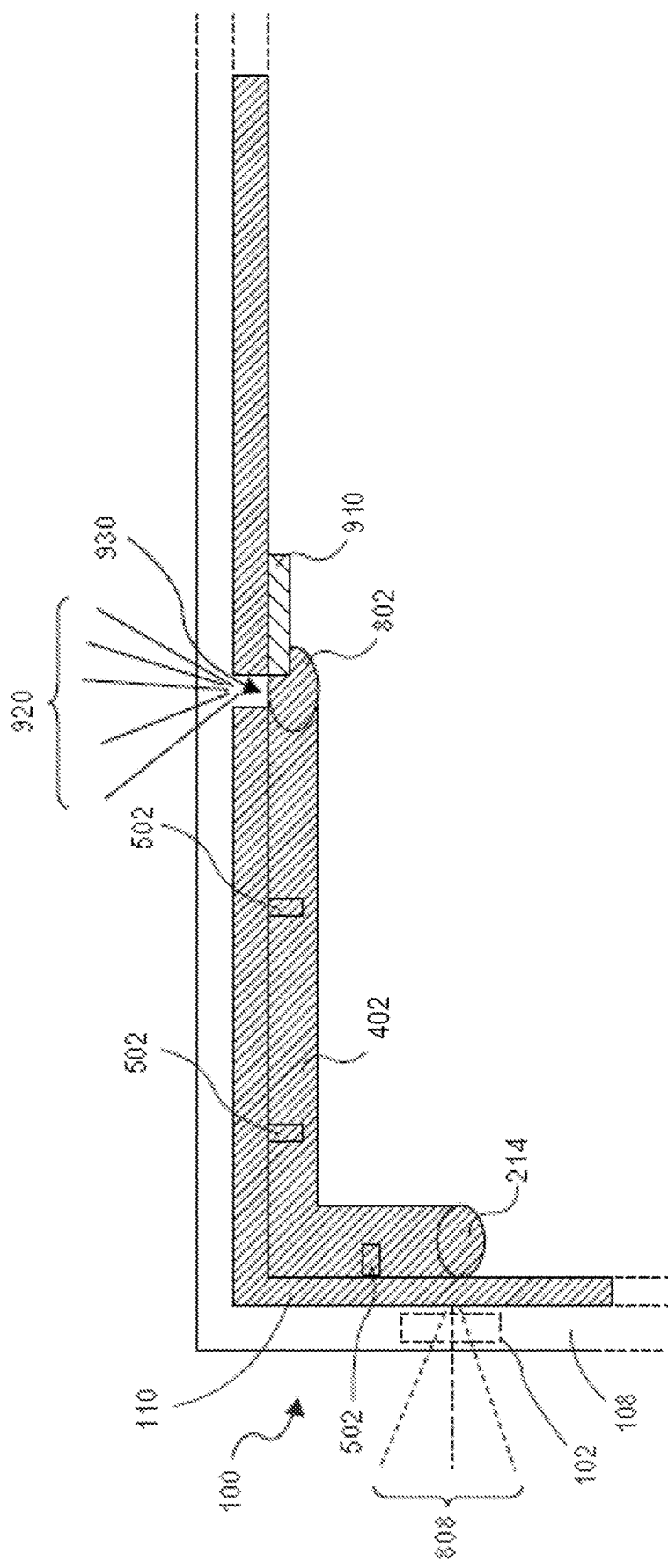
FIG. 9 illustrates a partial cross-sectional view of a second aspect of FIG. 7.

FIG. 9 illustrates a cross-sectional view of a second aspect of FIG. 7. The light unit 214 may further provide light to the light guide 402 as described previously. The light guide 402 being attached and arranged as described previously as well. The light guide 402 may terminate at an end 802 with a configuration to emit a light 920 externally from the vehicle 10. The light 920 providing the light feature 50 as previously described. For example, the light 920 providing a side signature light, a welcome light, an outside light, a side marker light, a park mode light, a roof pillar light, a rear quarter window light, a security light, and/or the like. It may provide illumination of an ornamental graphic, logo or the like. This graphic or logo may be in-molded in the portion 110, in the glazing 108, or both, or it may be a separate entity. The light 920 may have a color consistent with the light unit 214. Alternatively, the light 920 may be emitted through a color portion arranged in the light guide 402, the end 802, or the like in order to provide a desired color. The light unit 214 may also emit a light 808 through the portion 102 as noted above.

With further reference to FIG. 9, the light 920 may be emitted through a portion 930. In one aspect, the portion 930 may be configured to always emit light from the end 802. In another aspect, the portion 930 may include a blocking mechanism 910. The blocking mechanism 910 may have a first position as shown in FIG. 9 that allows the light 920 emitted from the end 802. The blocking mechanism 910 may have a second position (not shown) that prevents the light 920 emitted from the end 802. In this regard, the blocking mechanism 910 may be moved or extended to cover the portion 930 and block the light 920 from being emitted through portion 930.

The blocking mechanism 910 may slide manually from the first position to the second position by operation of a passenger or driver. The blocking mechanism 910 may slide automatically from the first position to the second position by operation of dedicated hardware. The blocking mechanism 910 may slide from the first position to the second position by operation of a solenoid, servo, or similar electromechanical component.

The light unit 214 may include one or more light components such as, for example, an incandescent lamp, an electroluminescent lamp, a gas discharge lamp, one or more a LEDs and the like. The light unit 214 may further include driver circuits, power connections, signal connections, and the like. The signal connections of the light unit 214 may be implemented wirelessly and receive control and command signals on a communication channel as defined herein. The driver circuit may include dedicated hardware to control the light unit 214 including to control the state of each individual light of the light unit 214 that may include color, flashing, and the like.

Additionally, the window including the plastic glazing 100 may further include various other components related to the features of a vehicle such as the vehicle 10. For example, the plastic glazing 100 may further include a spoiler portion and a supporting member. The supporting member may be a part of a housing unit (e.g., the housing unit 200) that is disposed behind the plastic glazing 100 for supporting the light unit 214 and the like. The spoiler portion may be formed of an additional thermoplastic polymer and may be attached to a main body using an adhesive or mechanical fastening system. The mechanical fastening system may be integrated in the molded parts or separate (e.g., screw, bolt, and the like). The spoiler portion may emit light associated with the light feature 50.

Additionally, any aspect of the disclosure utilizing the light unit 214 may be configured to provide illumination of an ornamental graphic, logo or the like. This graphic or logo may be in-molded in the portion 110, in the glazing 108, or both, or it may be a separate entity.

According to certain aspects of the disclosure, the window assembles disclosed herein may also include additional layers on top of the thermoplastic polymer layers. For example, a layer for increasing scratch resistance may be added to an exterior surface of the plastic glazing. As another example, an additional layer for adding more support to the thermoplastic polymer layers may also be added to an interior surface of the plastic glazing. This additional layer may be formed of a plastic, a metal, or other material for increasing the structural strength of the window.

As described above the plastic glazing the 100 may be manufactured using a molding process. In a particular aspect, a multi-shot injection technique may be used to form the plastic glazing 100. In a first shot, a clear translucent material may be injected into a mold cavity having a first volume to form the clear transparent portion 108. After the clear transparent portion 108 is formed, the mold cavity may be adjusted to a second volume and so on and so forth for receiving additional shots of material. In a second shot (or a third shot), a black or other colored opaque material for the portion 110 may be injected to the mold cavity such that it binds with the clear translucent material. The two materials may bind together through melt bonding. That is, heat from the injected opaque material may melt a surface of the already set clear translucent material such that a bond is formed between the two materials when they cool. During any one of the multi-shot injection molding processes the molded components 502, the cavity 212, the colored portion 102, or any other aspect set forth in the disclosure may be formed thus reducing costs and complexity of the manufacturing process. During any one of the multi-shot injection molding processes the light unit 214 or any other aspect set forth in the disclosure may be inserted and molded-in thus reducing costs and complexity of the manufacturing process.

Implementations of the light feature 50 manufactured consistent with the disclosure were found to provide greater than 10%-15% weight reduction in comparison to non-integrated implementations.

It will be appreciated that the present disclosure may include any one and up to all of the following examples.

Example 1. A plastic glazing of a window of a vehicle having a light feature, the plastic glazing comprising: a first vehicle window glazing component; a second vehicle window glazing component molded onto the first vehicle window glazing component; a light unit configured to produce light for the light feature; the light unit being integrated with at least one of the following: the first vehicle window glazing component and the second vehicle window glazing component; and the light unit further configured to direct the light for the light feature through or from at least one of the following: the first vehicle window glazing component and the second vehicle window glazing component, wherein the plastic glazing is of one-piece molded plastic construction; and wherein at least one of the first vehicle window glazing component and the second vehicle window glazing component is translucent or transparent.

Example 2. The plastic glazing of example 1, wherein the light unit is supported on at least one of the following: the first vehicle window glazing component and the second vehicle window glazing component, wherein the window comprises at least one of the following: a front window, a side window, a rear quarter window, a rear window, a front quarter window, and a panoramic window.

Example 3. The plastic glazing of any one of Examples 1-2, wherein the plastic glazing is attached to a housing unit that is configured to support the light unit, wherein the housing unit comprises a fiber-reinforced polymer.

Example 4. The plastic glazing of any one of Examples 1-3, further comprising a light guide configured to receive the light from the light unit, wherein the light guide is configured to one of the following: emit the received light along a length thereof to provide the light feature, deliver the light to an end thereof to provide the light feature internally within the vehicle, and deliver the light to an end thereof to provide the light feature externally from the vehicle.

Example 5. The plastic glazing of any one of Examples 1-4, further comprising molded components configured to hold the light guide, wherein the molded components are molded in at least one of the following: the first vehicle window glazing component and the second vehicle window glazing component.

Example 6. The plastic glazing of any one of Examples 1-5, further comprising a light blocking mechanism configured to block light emitted from the light guide in a first position and allow light to be emitted from the light guide in a second position.

Example 7. The plastic glazing of any one of Examples 1-6, wherein a portion of one or more of the first vehicle window glazing component and the second vehicle window glazing component forms a lens and the light unit is configured to emit light through the lens and also emit light through the light guide for the light feature.

Example 8. The plastic glazing of any one of Examples 1-7, wherein at least one of the first vehicle window glazing component and the second vehicle window glazing component comprises a surface configured to diffuse, scatter, or reflect light received from the light unit, wherein the surface comprises at least one of the following: a textured surface and a laser marked surface.

Example 9. The plastic glazing of any one of Examples 1-8, wherein the light unit comprises light emitting diodes (LEDs) and the LEDs are molded in at least one of the following: the first vehicle window glazing component and the second vehicle window glazing component.

Example 10. The plastic glazing of any one of Examples 1-9, wherein the light feature comprises at least one of the following: a side signature light, an outside light, a side marker light, a park mode light, a roof pillar light, a rear quarter window light, a welcome light, an interior reading light, an individual customizable light, an ambient light, a cargo light, a panoramic roof light, a brake light, a turn signal light, a running light, a reverse light, a fog light, and a security light.

Example 11. A process of manufacturing a plastic glazing of a window of a vehicle having a light feature, the process comprising: molding a first vehicle window glazing component; molding a second vehicle window glazing component molded onto the first vehicle window glazing component; integrating a light unit configured to produce light for the light feature with at least one of the following: the first vehicle window glazing component and the second vehicle window glazing component; and arranging the light unit to direct the light for the light feature through or from at least one of the following: the first vehicle window glazing component and the second vehicle window glazing component, and wherein at least one of the first vehicle window glazing component and the second vehicle window glazing component is translucent or transparent.

Example 12. The process of Example 11, wherein the light unit is supported on at least one of the following: the first vehicle window glazing component and the second vehicle window glazing component, wherein the window comprises at least one of the following: a front window, a side window, a rear quarter window, a rear window, a front quarter window, and a panoramic window.

Example 13. The process of any one of Examples 11-12, wherein the plastic glazing is attached to a housing unit that is configured to support the light unit, wherein the housing unit comprises a fiber-reinforced polymer.

Example 14. The process of any one of Examples 11-13, further comprising providing a light guide configured to receive light from the light unit, wherein the light guide is configured to one of the following: emit the received light along a length thereof to provide the light feature, deliver the light to an end thereof to provide the light feature internally within the vehicle, and deliver the light to an end thereof to provide the light feature externally from the vehicle.

Example 15. The process of any one of Examples 11-14, further comprising molding components configured to hold the light guide, wherein the components are molded in at least one of the following: the first vehicle window glazing component and the second vehicle window glazing component.

Example 16. The process of any one of Examples 11-15, further comprising arranging a light blocking mechanism configured to block light emitted from the light guide in a first position and allow light to be emitted from the light guide in a second position.

Example 17. The process of any one of Examples 11-16, wherein a portion of one or more of the first vehicle window glazing component and the second vehicle window glazing component forms a lens and the light unit is configured to emit light through the lens and also emit light through the light guide for the light feature.

Example 18. The process of any one of Examples 11-17, wherein at least one of the first vehicle window glazing component and the second vehicle window glazing component comprises a surface configured to diffuse, scatter, or reflect light received from the light unit, wherein the surface comprises at least one of the following: a textured surface and a laser marked surface.

Example 19. The process of any one of Examples 11-18, wherein the light unit comprises light emitting diodes (LEDs) and the process further includes molding the LEDs into at least one of the following: the first vehicle window glazing component and the second vehicle window glazing component.

Example 20. The process of any one of Examples 11-19, wherein the light feature comprises at least one of the following: a side signature light, an outside light, a side marker light, a park mode light, a roof pillar light, a rear quarter window light, a welcome light, an interior reading light, an individual customizable light, an ambient light, a cargo light, a panoramic roof light, a brake light, a turn signal light, a running light, a reverse light, a fog light, and a security light.

In general, systems and methods disclosed herein may alternately comprise, consist of, or consist essentially of, any appropriate components herein disclosed. The disclosure may additionally, or alternatively, be designed so as to be devoid, or substantially free, of any components used in the prior art compositions or that are otherwise not necessary to the achievement of the function and/or objectives of the present disclosure.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

It is to be understood that any thermoplastic material can be processed using the methods disclosed herein. For example, the polymer can include polyphenylene ether-based resin, polyacetal-based resin, polyimide-based resin, polystyrene-based resin, polymethyl methacrylate based resin, polyacrylonitrile-based resin, polyester-based resin, polycarbonate, polyphenylene sulfide, polyetherimide, polyethersulfone, polysulfone, polyether (ether) ketone, polyolefin-based resin, polyethylene terephthalate based resin (PET), poly p phenylene based resin, polyvinyl chloride (PVC) based resin, polytetrafluoroethylene (PTFE) based resin and combinations including at least one of the foregoing.

Aspects of the disclosure may include communication channels associated with the dedicated hardware to control the light unit 214 that may be any type of wired or wireless electronic communications network, such as, e.g., a wired/wireless local area network (LAN), Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof.

Further in accordance with various aspects of the disclosure, the methods described herein are intended for operation with dedicated hardware implementations including, but not limited to, microprocessors, PCs, PDAs, semiconductors, application specific integrated circuits (ASIC), programmable logic arrays, and other hardware devices constructed to implement the methods described herein.

Aspects of the present disclosure described in connection with illustrated aspects have been presented by way of illustration, and the present disclosure is therefore not intended to be limited to the disclosed aspects. Furthermore, the structure and features of each aspect described herein can be applied to the other aspects described herein. Accordingly, those skilled in the art will realize that the present disclosure is intended to encompass all modifications and alternative arrangements included within the spirit and scope of the present disclosure, as set forth by the appended claims.

What is claimed is:

1. A plastic glazing of a window of a vehicle having a light feature, the plastic glazing comprising:
a first vehicle window glazing component forming a clear transparent portion of the plastic glazing;
a second vehicle window glazing component molded onto the first vehicle window glazing component, forming a colored portion of the plastic glazing, either translucent or opaque;
a graphic in-molded to at least one of the first vehicle window glazing component and the second vehicle window glazing component,
a light unit configured to produce light for the light feature and emit light through a first portion of at least one of the first vehicle window glazing component and the second vehicle window glazing component, the light unit being integrated with at least one of the first vehicle window glazing component and the second vehicle window glazing component; and
the plastic glazing further comprising a light guide configured to receive the light from the light unit, wherein the light guide is configured to deliver the light to the graphic to emit light externally from the vehicle;
wherein the light unit is configured to direct the light for the graphic through or from at least one of the first vehicle window glazing component and the second vehicle window glazing component, and
wherein the plastic glazing is of one-piece molded plastic construction.

2. The plastic glazing of claim 1, wherein the light unit is supported on at least one of the first vehicle window glazing component and the second vehicle window glazing component,
wherein the plastic glazing comprises at least one of a front window, a side window, a rear quarter window, a rear window, a front quarter window, and a panoramic window.

3. The plastic glazing of claim 1, wherein the plastic glazing is attached to a housing unit that is configured to support the light unit, wherein the housing unit comprises a fiber-reinforced polymer.

4. The plastic glazing of claim 1, further comprising molded components configured to hold the light guide, wherein the molded components are molded in at least one of the first vehicle window glazing component and the second vehicle window glazing component.

5. The plastic glazing of claim 1, wherein the graphic is formed of a colored thermoplastic having a color other than a color of either the first vehicle window glazing component or the second vehicle window glazing component.

6. The plastic glazing of claim 1, wherein at least one of the first vehicle window glazing component and the second vehicle window glazing component comprises a surface configured to diffuse, scatter, or reflect light received from the light unit, wherein the surface comprises at least one of a textured surface and a laser marked surface; and/or
wherein a portion of one or more of the first vehicle window glazing component and the second vehicle window glazing component forms a lens and the light unit is configured to emit light through the lens and also emit light through the light guide for the light feature.

7. The plastic glazing of claim 1, wherein the light feature comprises at least one of a side signature light, an outside light, a side marker light, a park mode light, a roof pillar light, a rear quarter window light, a welcome light, an interior reading light, an individual customizable light, an ambient light, a cargo light, a panoramic roof light, a brake light, a turn signal light, a running light, a reverse light, a fog light, and a security light; and/or
wherein the light unit comprises light emitting diodes (LEDs) molded in at least one of the first vehicle window glazing component and the second vehicle window glazing component.

8. The plastic glazing of claim 1, wherein graphic includes text.

9. The plastic glazing of claim 1, wherein a length of the light guide is defined by two opposing ends, a distal end and a proximal end; wherein the length is greater than a width or height of the light guide; wherein the light guide is configured to receive the light from the light unit through the proximal end and wherein the light guide is configured to one of the following: emit the received light along a surface of the light guide that defines the length of the light guide, deliver the light to the distal end thereof to provide the light feature internally within the vehicle, and deliver the light to the distal end thereof to provide the light feature externally from the vehicle.

10. A process of manufacturing a plastic glazing of a window of a vehicle having a light feature, the process comprising:
  molding a first vehicle window glazing component;
  molding a second vehicle window glazing component molded onto the first vehicle window glazing component;
  in-molding a graphic into at least one of the first vehicle window glazing component and the second vehicle component;
  integrating a light unit configured to produce light for the light feature and emit light through a first portion, the light unit integrated with at least one of the first vehicle window glazing component and the second vehicle window glazing component; and
  arranging the light unit to direct the light for the light feature through or from at least one of the first vehicle window glazing component and the second vehicle window glazing component,
  providing a light guide configured to receive light from the light unit,
  wherein the light guide is configured for delivering the light to the graphic such that the graphic emits light externally from the vehicle, and
  wherein at least one of the first vehicle window glazing component and the second vehicle window glazing component is translucent or transparent.

11. The process of claim 10, wherein the light unit is supported on at least one of the first vehicle window glazing component and the second vehicle window glazing component,
  wherein the window comprises at least one of a front window, a side window, a rear quarter window, a rear window, a front quarter window, and a panoramic window.

12. The process of claim 10, further comprising arranging a light blocking mechanism configured to block light emitted from the light guide in a first position and allow light to be emitted from the light guide in a second position.

13. The process of claim 10, wherein a portion of one or more of the first vehicle window glazing component and the second vehicle window glazing component forms a lens and the light unit is configured to emit light through the lens and also emit light through the light guide for the light feature.

14. The process of claim 10, wherein at least one of the first vehicle window glazing component and the second vehicle window glazing component comprises a surface configured to diffuse, scatter, or reflect light received from the light unit,
  wherein the surface comprises at least one of a textured surface and a laser marked surface.

15. The process of claim 10, wherein the light unit comprises light emitting diodes (LEDs) and the process further includes molding the LEDs into at least one of the first vehicle window glazing component and the second vehicle window glazing component.

16. The process of claim 10, wherein the light feature comprises at least one of a side signature light, an outside light, a side marker light, a park mode light, a roof pillar light, a rear quarter window light, a welcome light, an interior reading light, an individual customizable light, an ambient light, a cargo light, a panoramic roof light, a brake light, a turn signal light, a running light, a reverse light, a fog light, and a security light.

17. A plastic glazing of a window of a vehicle having a light feature, the plastic glazing comprising:
  a first vehicle window glazing component forming a clear transparent portion of the plastic glazing;
  a second vehicle window glazing component molded onto the first vehicle window glazing component, forming a colored portion of the plastic glazing, either translucent or opaque; and
  a light unit configured to produce light for the light feature and emit light through a first portion of at least one of the first vehicle window glazing component and the second vehicle window glazing component, the light unit being integrated with at least one of the first vehicle window glazing component and the second vehicle window glazing component;
  wherein an image defined in at least one of the first vehicle window glazing component and the second vehicle component by one of laser-marking or texturing,
  wherein the light unit is configured to deliver the light to the image to emit light externally from the vehicle,
  wherein the light unit is configured to direct the light for the image through or from at least one of the first vehicle window glazing component and the second vehicle window glazing component, and
  wherein the plastic glazing is of one-piece molded plastic construction.

18. The plastic glazing of claim 17, wherein the image is formed of a colored thermoplastic having a color other than a color of either the first vehicle window glazing component or the second vehicle window glazing component.

19. The plastic glazing of claim 17, wherein the light unit is configured to deliver light to the image via edge lighting one of the first vehicle window glazing component or the second vehicle window component.

20. The plastic glazing of claim 17, wherein the image includes text.

* * * * *